United States Patent
Ibryam (10) Patent No.: US 10,990,402 B1
(45) Date of Patent: Apr. 27, 2021

(54) ADAPTIVE CONSUMER BUFFER

(71) Applicant: Red Hat, Inc., Raleigh, NC (US)

(72) Inventor: Bilgin Ismet Ibryam, London (GB)

(73) Assignee: Red Hat, Inc., Raleigh, NC (US)

( * ) Notice: Subject to any disclaimer, the term of this patent is extended or adjusted under 35 U.S.C. 154(b) by 0 days.

(21) Appl. No.: 16/719,539

(22) Filed: Dec. 18, 2019

(51) Int. Cl.
*G06F 9/38* (2018.01)
*G06F 12/0875* (2016.01)
*G06F 9/50* (2006.01)

(52) U.S. Cl.
CPC .......... *G06F 9/3838* (2013.01); *G06F 9/5016* (2013.01); *G06F 12/0875* (2013.01); *G06F 2212/452* (2013.01)

(58) Field of Classification Search
None
See application file for complete search history.

(56) References Cited

U.S. PATENT DOCUMENTS

| | | | | |
|---|---|---|---|---|
| 2005/0273668 A1* | 12/2005 | Manning | ............. | H04L 12/66 714/39 |
| 2010/0281491 A1* | 11/2010 | Surlaker | ............. | G06F 9/546 719/314 |
| 2014/0337537 A1* | 11/2014 | Raajaratnam | ......... | H04L 67/141 709/228 |
| 2014/0359036 A1* | 12/2014 | Blakers | ............. | H04L 51/26 709/206 |
| 2017/0366415 A1* | 12/2017 | Makrucki | ............. | H04L 41/147 |
| 2018/0234379 A1* | 8/2018 | Clark | ............. | H04L 51/26 |
| 2019/0230186 A1 | 7/2019 | Yellin et al. | | |
| 2019/0236150 A1* | 8/2019 | Zaslavsky | ............. | G06F 16/2308 |
| 2019/0306170 A1 | 10/2019 | Wang et al. | | |

(Continued)

FOREIGN PATENT DOCUMENTS

| | | |
|---|---|---|
| CN | 110188080 A | 8/2019 |
| CN | 110222043 A | 9/2019 |
| WO | WO 1994018771 A1 | 8/1994 |

OTHER PUBLICATIONS

Sajith Ekanayaka, Malith Jayasinghe, Asanka Abeyweera, Ruwan Linton; "Improving the Performance of WSO2 MB by Controlling Buffer Limits"; DZone; Performance Zone Tutorial; Published Aug. 6, 2018; 5 Pages.

(Continued)

*Primary Examiner* — Charles E Anya
(74) *Attorney, Agent, or Firm* — K&L Gates LLP (57) ABSTRACT

The present disclosure provides for a system that dynamically adjusts how the system distributes messages to a set of consumers. The system measures a quantity of consumers in communication with the system. The system also measures performance metrics of each respective consumer of the set of consumers. In response to a change in the quantity of consumers, or to one or more performance metrics of an individual consumers meeting, or failing to meet, a respective predetermined threshold, the system may adjust a cache size the system attributes to the individual consumer and accordingly may adjust how the system distributes messages to the individual consumer. For instance, the system may distribute more or less messages to the individual consumer. The individual consumer may also communicate a maximum cache limit it is able to receive in messages from the system.

20 Claims, 5 Drawing Sheets

(56) References Cited

U.S. PATENT DOCUMENTS

2019/0334770 A1   10/2019  Xiang et al.
2020/0012545 A1*  1/2020  Zhang .................. G06F 9/4843

OTHER PUBLICATIONS

Apache ActiveMQ; "What is the Prefetch Limit for?"; ActiveMQ Artemis; Accessed Date: Dec. 18, 2019; http://activemq.apache.org/what-is-the-prefetch-limit-for.html; 2 Pages.
Apache ActiveMQ; "Flow Control"; ActiveMQ Artemis Documentation; Accessed Date: Dec. 18, 2019; https://activemq.apache.org/components/artemis/documentation/latest/flow-control.html; 5 Pages.

* cited by examiner

ADAPTIVE CONSUMER BUFFER

BACKGROUND

A producer application may transmit messages to a consumer application. When the number of producers and consumers, and the number of messages being transmitted, scales to a large number, a message broker may be used. A message broker may receive messages from a group of producers and may determine how to distribute the messages to a group of consumers. The message broker may distribute the messages equally to the group of consumers or may distribute the messages unequally to the group of consumers. The message broker may also translate the messages from a formal messaging protocol of the producer to a formal messaging protocol of the consumer.

SUMMARY

The present disclosure provides new and innovative systems and methods for processing messages with a thread pool. In an example, a system includes a processor in communication with a memory. The processor is configured to receive a maximum cache limit from each of a plurality of consumers in communication with the processor. Each maximum cache limit includes a maximum measurable quantity. The processor transmits a first set of messages to a first consumer of the plurality of consumers. The first set of messages includes a first measurable quantity less than or equal to the respective maximum measurable quantity of the maximum cache limit of the first consumer. The processor determines a quantity of the plurality of consumers and compare the determined quantity of the plurality of consumers to a previously determined quantity. The processor is also configured to determine one or more performance metrics related to the first consumer after transmitting the first set of messages, and to transmit a second set of messages to the first consumer. The second set of messages includes a second measurable quantity based on at least one of a change in the quantity of consumers and the one or more performance metrics meeting a respective predetermined threshold.

In an example, a method includes receiving a maximum cache limit from each of a plurality of consumers in communication with the processor. Each maximum cache limit includes a maximum measurable quantity. A first set of messages are then transmitted to a first consumer of the plurality of consumers. The first set of messages includes a first measurable quantity less than or equal to the respective maximum measurable quantity of the maximum cache limit of the first consumer. A quantity of the plurality of consumers are then determined and compared to a previously determined quantity. The method also includes determining one or more performance metrics related to the first consumer after transmitting the first set of messages, and transmitting a second set of messages to the first consumer. The second set of messages includes a second measurable quantity based on at least one of a change in the quantity of consumers and the one or more performance metrics meeting a respective predetermined threshold.

In an example, a non-transitory, computer-readable medium stores instructions. The instructions, when performed by a processor, cause the processor to receive a maximum cache limit from each of a plurality of consumers in communication with the processor. Each maximum cache limit includes a maximum measurable quantity. The processor transmits a first set of messages to a first consumer of the plurality of consumers. The first set of messages includes a first measurable quantity less than or equal to the respective maximum measurable quantity of the maximum cache limit of the first consumer. The processor determines a quantity of the plurality of consumers and compare the determined quantity of the plurality of consumers to a previously determined quantity. The instructions also cause the processor to determine one or more performance metrics related to the first consumer after transmitting the first set of messages, and to transmit a second set of messages to the first consumer. The second set of messages includes a second measurable quantity based on at least one of a change in the quantity of consumers and the one or more performance metrics meeting a respective predetermined threshold.

Additional features and advantages of the disclosed method and apparatus are described in, and will be apparent from, the following Detailed Description and the Figures. The features and advantages described herein are not all-inclusive and, in particular, many additional features and advantages will be apparent to one of ordinary skill in the art in view of the figures and description. Moreover, it should be noted that the language used in the specification has been principally selected for readability and instructional purposes, and not to limit the scope of the inventive subject matter.

DETAILED DESCRIPTION

Message brokers are configured to store messages received from producers in one or more queues and to distribute the messages to consumer caches so that the consumers may process the messages. It can be a challenge, however, to determine how a message broker should be configured to distribute the messages to consumer caches. Sending too little messages may leave consumers underutilized and/or may cause consumers to frequently poll the message broker for more new messages, both of which can slow down the message processing system's performance. Conversely, sending too many messages to a consumer may also harm the message processing system's performance. For instance, sending too many messages may cause the consumer to run out of memory, which results in the consumer failing to process the messages it receives. Additionally, the messages stored in a consumer's cache are not accessible to other consumers, and thus sending too many messages may result in messages sitting idle in a consumer's cache that could otherwise be processed by a different consumer.

One way for a message broker to distribute messages to a set of consumers is by a pull model in which the message broker distributes the messages upon a request from a consumer. Pulling messages individually, however, is not efficient, and this distribution method may increase the per message latency significantly.

Another way for a message broker to distribute messages is by a push model in which the message broker sends messages to consumers without first being requested. The push model method ensures that a consumer always has a local cache of messages ready to process. If the number of messages sent to a consumer is not limited, however, there is a risk that a consumer may run out of memory and be rendered unable to process messages. This is often a consequence of message processing typically being much slower than message delivery.

One way to limit the number of messages sent to an individual consumer is for a message broker to be configured with a limit (e.g., a prefetch limit) on the maximum number of messages that can be dispatched to an individual consumer at once. The limit may alternatively be a quantity of data (e.g., bytes) instead of a number of messages, though only a number of messages will be referenced in this example. A consumer may use the limit to size its own message cache. Once a message broker has sent the maximum limit of messages to a consumer, the broker will not send any more messages to that consumer until the message broker receives an indication to send more messages. For example, the message broker may send more messages once the consumer acknowledges a certain percentage (e.g., 50%) of the messages that it received. The message broker may then send more messages to the consumer to refill the consumer's message cache back to the maximum. For example, if the message broker sends a maximum of ten messages, and the consumer acknowledges five messages, the message broker will send another five messages to refill the consumer's cache.

Determining an ideal maximum limit to maximize message processing performance, however, can be difficult. The maximum number of messages that a given consumer can process may vary across consumers based on a variety of factors. For example, the maximum number of messages a consumer can process may depend on the consumer's available memory, which can vary across time and across the different deployment environments in which consumers reside. Thus, a set maximum limit may be too many messages for one consumer, whereas it leaves a different consumer underutilized. The consumers receiving too many messages may fail to process messages or may perform with a greater latency than other consumers. The underutilized consumers may process messages with an acceptable throughput and low latency, but they could be processing more messages, even if it degrades their own latency, to take some of the burden off of the consumers receiving too many messages and enhance the system's overall message processing throughput and latency. Accordingly, the system's overall message processing throughput and latency is limited.

In another example, the ideal maximum limit may depend on how many consumers are in communication with the message broker. For instance, a message broker may distribute the maximum number of messages to a first consumer before it delivers any messages to a second consumer. Thus, if the maximum limit is set too high, all of the messages may be distributed to a few consumers while other consumers do not receive any messages. Overall system throughput and latency is thus limited because messages that could be concurrently processed are instead waiting on a few consumers' caches. Such a result is inefficient because some consumers remain idle that could otherwise be utilized to concurrently process messages. The number of consumers may vary across time and across deployment environments, such as when consumers are implemented by serverless functions.

Accordingly, the present disclosure provides for a system and method that enhances message processing efficiency by basing a message broker's message distribution on the consumers in communication with the message broker. For example, the message broker may distribute messages to a consumer based on the quantity of consumers that there are. The message broker may also distribute messages to a consumer based on measured performance metrics of the consumer, such as throughput and latency. Additionally, the message broker may limit the number of messages sent to an individual consumer based on information received from the individual consumer. The consumer may base such information on the amount of available memory that the consumer has. Thus, by configuring a message broker to distribute messages according to measured performance metrics and/or a specific consumer's available memory, the message broker may more properly distribute messages to each individual consumer in order to maximize overall message processing efficiency. For instance, the message broker may distribute messages such that a maximum amount of messages are concurrently processed in order to maximize the system's overall throughput and minimize the system's overall latency.

Figure 1:
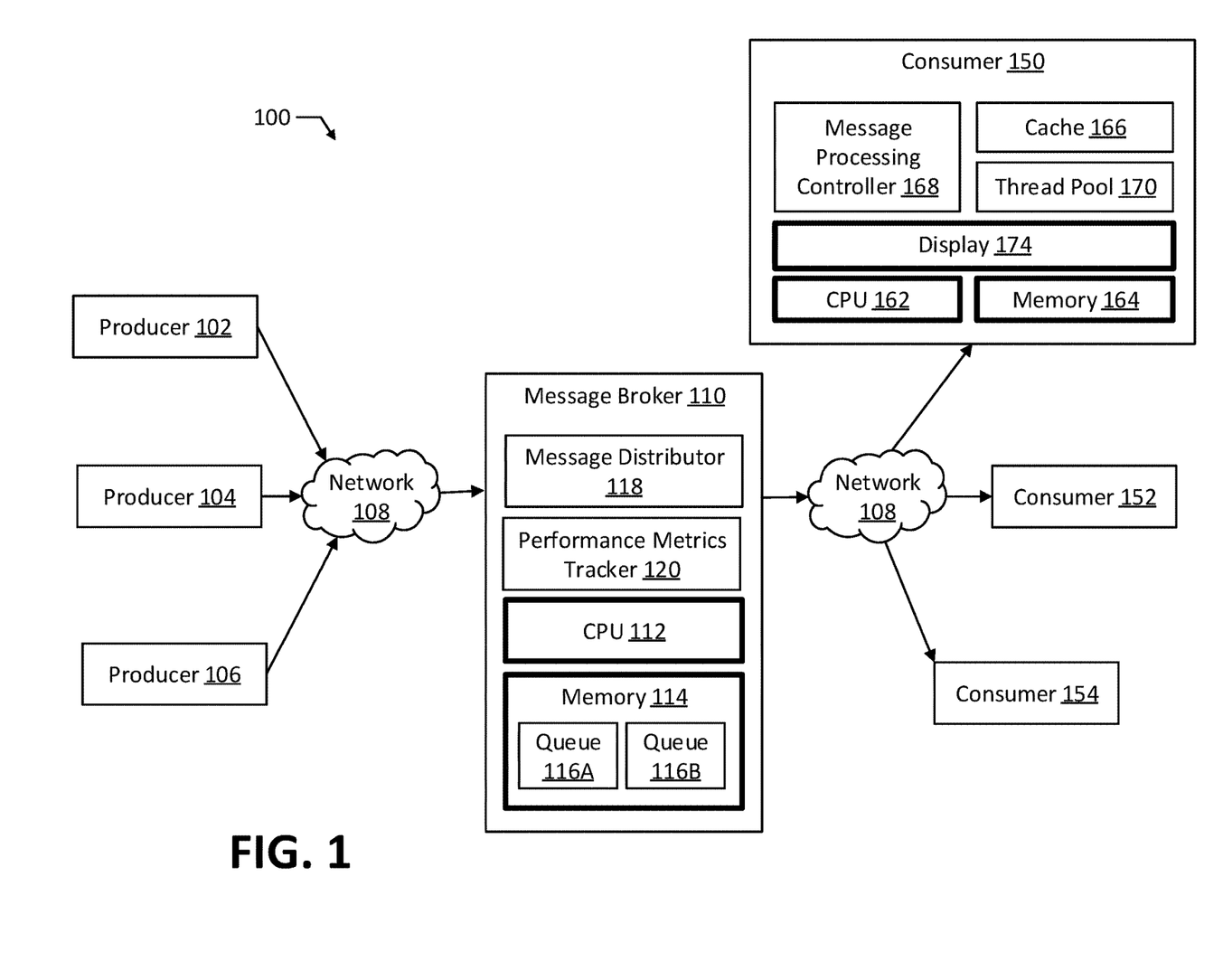
FIG. 1 shows an example message processing system, including producers, consumers, and a message broker, according to an aspect of the present disclosure.

FIG. 1 shows a box diagram of an example system 100 for processing messages, according to an aspect of the present disclosure. The example system 100 may include a set of producers 102, 104, and 106 that transmit messages to a message broker 110, which transmits the messages to a set of consumers 150, 152, 154. For instance, the messages may be transmitted over a network 108. The network 180 can include, for example, the Internet or some other data network, including, but not limited to, any suitable wide area network or local area network.

FIG. 1 also shows a box diagram of an example message broker 110, according to an aspect of the present disclosure. The example message broker 110 may include a processor in communication with a memory 114, a message distributor 118, and a performance metrics tracker 120. In other examples, the components of the message broker 110 may be combined, rearranged, removed, or provided on a separate device or server. The processor may be a CPU 112, an ASIC, or any other similar device. In some examples, the message broker 110 may store the messages received from the producers 102, 104, 106 in one or more queues 116A, 116B in its memory 114. The message distributor 118 of the message broker 110 may be programmed to transmit the messages from the one or more queues 116A, 116B to a set of consumers 150, 152, 154, for instance, over the network 108. The message distributor 118 may be implemented by software executed by the CPU 112.

The performance metrics tracker 120 may be programmed to measure one or more performance metrics of the consumers 150, 152, and 154. For instance, in some examples, the performance metrics may be throughput and/or latency. The performance metrics tracker 120 may also be programmed to measure a quantity of consumers 150, 152, 154 in communication with the message broker 110. The performance metrics tracker 120 may be implemented by software executed by the CPU 112.

FIG. 1 also illustrates a box diagram of an example consumer 150, according to an aspect of the present disclosure. The example consumer 150 may include a processor in communication with a memory 164. The processor may be a CPU 162, an ASIC, or any other similar device. The example consumer 150 may also include a display 174. The display 174 may be any suitable display for presenting information and may be a touch display. The example consumer 150 may also include a message cache 166 for storing messages received from the message broker 110. The example consumer 150 may also include a thread pool 170 that includes a quantity of threads kept in reserve for executing tasks. In some instances, the example consumer 150 may also include a message processing controller 168 for allocating threads in the thread pool 170 to process messages. The message processing controller 168 may also be programmed to transmit to the message broker 110 a maximum limit of messages that the cache 166 will receive from the message broker 110. The message processing controller 168 may be implemented by software executed by the CPU 162.

Figure 2:
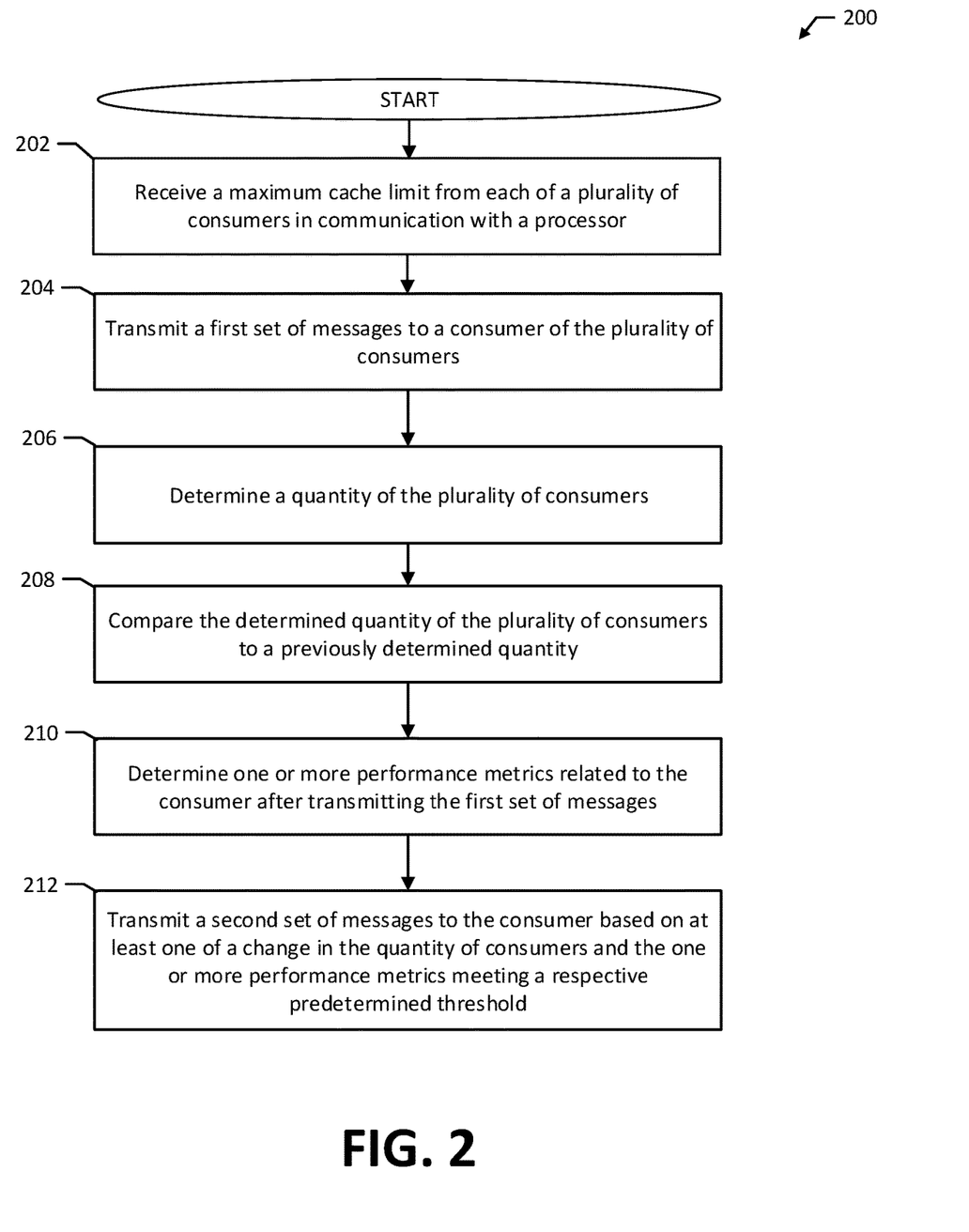
FIG. 2 shows a flowchart of an example method for distributing messages to consumers, according to an aspect of the present disclosure.

FIG. 2 shows a flowchart of an example method 200 for distributing messages, according to an aspect of the present disclosure. Although the example method 200 is described with reference to the flowchart illustrated in FIG. 2, it will be appreciated that many other methods of performing the acts associated with the method 200 may be used. For example, the order of some of the blocks may be changed, certain blocks may be combined with other blocks, and some of the blocks described are optional. The method 200 may be performed by processing logic that may comprise hardware (circuitry, dedicated logic, etc.), software, or a combination of both.

The example method 200 includes receiving a maximum cache limit from each of a plurality of consumers in communication with a processor (block 202). For example, the maximum cache limit includes a maximum measurable quantity, which may include a quantity of messages (e.g., 50) or a quantity of data (e.g., bytes). In some instances, the maximum cache limit for a respective consumer may be a set limit programmed into the consumer's memory.

In other instances, the maximum cache limit for a respective consumer may be based on a percentage (e.g., 70%) of memory that the consumer has available. For example, a consumer may have 256 MB of heap and the consumer's maximum cache limit may be a certain percentage of the heap (e.g., 10%) in order to protect the consumer from running out of memory and being overfilled with messages. In an example, a consumer 150 may have a memory usage of 10% due to a downstream application, and thus has 90% of its memory available. In some instances, the consumer 150 may allocate the full 90% of its available memory to determine its maximum cache limit. In other instances, the consumer 150 may allocate a percentage less than (e.g., 10%, 50%, 80%, 85%), the full 90% of its available memory to provide a buffer in an attempt to prevent the consumer 150 from reaching 100% and running out of memory. If the consumer 150 were to run out of memory, the consumer 150 may begin to fail to process messages or may experience a drastic rise in latency.

From the allocated percentage (e.g., 80%), the consumer 150 may be configured to determine, for example, a quantity of messages (e.g., 30) or a quantity of data (e.g., 15 MB) that the consumer 150 is able to process concurrently with the allocated percentage. The quantity of messages and data that a given consumer may concurrently process with a given amount of available memory may vary across consumers.

For example, the consumer 150 may be able to concurrently process 30 messages or 15 MB with 80% of its memory allocated, whereas a consumer 152 may be able to concurrently process 60 messages and 30 MB with 80% of its memory allocated. In such examples, this quantity of messages (e.g., 30) or quantity of data (e.g., 15 MB) is the maximum cache limit that the consumer 150 sends and the message broker 110 receives. In some examples, the message broker 110 may receive a maximum cache limit from a consumer 150 when the consumer 150 first polls the message broker 110 for messages. In some examples, the message broker 110 may periodically receive a maximum cache limit from a consumer 150 at some later time after the consumer 150 first polled the message broker 110 for messages, and while the consumer 150 is in communication with the message broker 110, to update the message broker 110 as the available memory of the consumer 150 changes due to a variety of factors, such as downstream applications.

In various aspects of the present disclosure, the maximum cache limit of each respective consumer is specific to a given consumer. Thus, in some instances, each respective consumer may have a maximum cache limit that is different than each of the other respective consumers. For example, in instances in which consumers' maximum cache limits are based on available memory, each of the consumers may have a different amount of available memory, and thus a different maximum cache limit. For instance, each consumer may be manufactured with hardware that includes a different amount of available memory (e.g., 64 MB, 256 MB, 512 MB). In another instance, each consumer may have the same manufactured memory, but may have a different level of its memory utilized (e.g., 20%, 60%, 90%) at any given point in time. In another instance, two consumers may have the same amount of available memory, but may allocate different amounts of that available memory to their maximum cache limits. In another instance, as described above, two consumers may have the same amount of available memory, but have different maximum cache limits based on the respective consumer's processing capability with its available memory. In an example, the consumer 150 has 90% available memory with 80% allocated and a maximum cache limit of 30 messages, a consumer 152 has 70% available memory with 60% allocated and a maximum cache limit of 20 messages, and a consumer 154 has 98% available memory with 88% allocated and a maximum cache limit of 70 messages.

Accordingly, the received maximum cache limits individualized to each respective consumer enable a message broker to deliver a quantity of messages or data to a consumer that the consumer will be able to process. Additionally, the individualized maximum cache limits may also help avoid a message broker underutilizing a particular consumer. For example, a message broker 110 configured to transmit a set maximum limit of 25 messages transmits 25 messages to the consumer 150, transmits 25 messages to the consumer 152, and transmits 25 messages to the consumer 154. At this point in time, the consumer 150 has a maximum cache limit of 30 messages and is able to process the received 25 messages, but the consumer 152 has a maximum cache limit of 20 messages and thus the received 25 messages uses 100% of its memory causing the consumer 152 to fail to process the messages. The consumer 154 has a maximum cache limit of 70 messages and thus also processed the received 25 messages. If instead the message broker 110 receives maximum cache limits from each respective consumer 150, 152, 154, the message broker 110 distributes the 75 total messages by transmitting 30 messages to the consumer 150, transmitting 20 messages to the consumer 152, and transmitting 25 messages to the consumer 154 so that the message broker 110 does not exceed the maximum cache limit of any consumer 150, 152, 154 and they all successfully process the messages.

In some aspects of the present disclosure, multiple maximum cache limits may be received from a single consumer in which each maximum cache limit corresponds to a specific queue storing messages. In an example, a message broker 110 includes a queue 116A storing messages and a queue 116B storing messages. The queue 116A may store messages that require minimal processing, while the queue 116B may store messages that require greater per message processing. For example, the queue 116B may store messages requiring additional protocol conversion. Thus, in such an example, the message broker 110 may receive a maximum cache limit (e.g., 40 MB) from the consumer 150 corresponding to the queue 116A that is greater than a maximum cache limit (e.g., 20 MB) from the consumer 150 corresponding to the queue 116B. For instance, the consumer 150 may limit to a greater degree the quantity/data of messages it receives from the queue 116B given the higher processing requirements of the messages it stores.

The example method 200 may also include transmitting a first set of messages to a consumer of the plurality of consumers (block 204). For example, the first set of messages may include a first measurable quantity less than or equal to the respective maximum measurable quantity of the first consumer. The first set of messages may be treated as an initial cache size that the message broker 110 attributes to the consumer 150, and therefore the first set of messages maxes out the initial cache size. Thus, in some instances, the first set of messages (e.g., 30 messages), or initial cache size, may be equal to the maximum measurable quantity (e.g., 30 messages) of the maximum cache size that the message broker 110 receives from a consumer 150. In other instances, the message broker 110 may attribute an initial cache size (e.g., 20 messages) to a consumer 150 less than the maximum cache size (e.g., 30 messages) received from the consumer 150 to maximize message processing efficiency based on various factors described here, such as the quantity of consumers in communication with the message broker 110.

In some aspects of the present disclosure, the size of the first set of messages, the measurable quantity, is based on a quantity of the consumers. In an example, a message broker 110 with 50 messages in its queue 116A may start by transmitting a first set of ten messages to the consumer 150 if there are five consumers in communication with the message broker 110, but may transmit a first set of five messages to the consumer 150 if there are ten consumers in communication with the message broker. For instance, by spreading the messages out among the consumers when there are more consumers, the message broker 110 decreases the risk that an individual consumer will run out of memory and decreases the risk that messages will remain in a consumer's cache while another consumer does not have any messages. Accordingly, the message broker 110 may increase overall message processing efficiency (e.g., overall throughput and latency per consumer in communication with the message broker 110).

In some aspects of the present disclosure, the size of the first set of messages, the measurable quantity, is based on a default cache size. In an example, the message broker 110 may store a default cache size (e.g., 5 messages) in its memory 114 and when a consumer 150 first communicates with the message broker 110, the message distributor 118 of the message broker 110 may transmit the default cache size as the first set of messages to the consumer 150. In other words, each time a consumer first communicates with the message broker 110, the message distributor 118 of the message broker 110 starts by transmitting the default cache size of messages stored in its memory 114 to the consumer. The message distributor 118 of the message broker 110 from that point on may vary the size of the sets of messages it transmits to the consumer based on other factors, which will be described in more detail below.

In some aspects, the size of the first set of messages may be specific to a respective consumer based on a history with that respective consumer. For instance, a default cache size for a respective consumer may be based on a plurality of transmitted sets of messages to the respective consumer and a plurality of determined performance metrics (e.g., throughput and/or latency) of the respective consumer. Determining performance metrics of a consumer will be discussed in more detail below. In an example, a message broker 110 may transmit messages to a consumer 150 over a period (e.g., 5 minutes or a quantity of messages), and may measure performance metrics of the consumer over that period. For example, the performance metrics tracker 120 of the message broker 110 may measure performance metrics of the consumer 150 after each instance the message broker 110 transmits one or more messages to the consumer 150, after a certain quantity of messages transmitted, or after a predetermined period of time.

From the measured performance metrics over the period, the performance metrics tracker 120 may determine an attributed cache size (e.g., quantity of messages or data) that generates the best combination of performance metrics for the consumer 150. For example, a best throughput may be measured as a maximum achieved throughput or a maximum average throughput per message processed. A best latency would conversely be measured as a minimum achieved latency or a minimum average latency per message processed. In some instances, the maximum/minimum average may be a maximum/minimum moving average over a window, for example, a maximum/minimum average over a certain period of time (e.g., 30 secs). In some instances, the average may be a weighted average. For example, attributing a cache size of 100 messages to the consumer 150 may cause the consumer 150 to have an average throughput of 20 msg/s and an average latency of 40 ms, which are determined to be better than the performance metrics when attributing a cache size of 125 messages that caused the consumer 150 to have an average throughput of 22 msg/s and an average latency of 80 ms.

The attributed cache size (e.g., 100 messages) that generates the best performance metrics may be saved in the memory 114 of the message broker 110 as a default cache size for the respective consumer 150. Thus, when the consumer 150 disconnects from the message broker 110, and reconnects at a later time, the message broker 110 will start by transmitting the attributed cache size (e.g., 100 messages) to the consumer 150.

In some aspects, the size of the first set of messages may be based on previously transmitted sets of messages to a consumer other than the consumer that is receiving the first set of messages. In an example, it may be determined that a set of 100 messages caused the consumer 150 to perform with its best performance metrics. Thus, when the consumer 152 polls the message broker 110 for messages for the first time, the message broker will send a set of 100 messages to the consumer 152.

The example method 200 may also include determining a quantity of the plurality of consumers (block 206). In various instances, the quantity of consumers that are in communication with a message broker may vary, and thus the quantity of consumers that a message broker may transmit messages to may vary. In an example, a consumer 150, a consumer 152, and a consumer 154 may be in communication with the message broker 110 and the performance metrics tracker 120 of the message broker 110 may determine that the quantity of consumers is three. The example method 200 may also include comparing the determined quantity of the plurality of consumers to a previously determined quantity (block 208). In the example, the consumer 154 may have polled the message broker 110 for the first time since the performance metrics tracker 120 had last determined the quantity of consumers. Thus, the last time the performance metrics tracker 120 had determined the quantity of consumers it was only the consumer 150 and the consumer 152. Therefore, the performance metrics tracker 120 of the message broker 110 may compare the determined quantity (e.g., three) to the previously determined quantity (e.g., two).

The example method 200 may also include determining one or more performance metrics related to the consumer after transmitting the first set of messages (block 210). In some examples, the one or more performance metrics may include throughput and/or latency. Throughput may include a rate at which the consumer 150 processes messages. For example, throughput may be measured in bytes per second (b/s) or messages per second (msg/s). Latency may include an amount of time it takes for the consumer 150 to process a message. For example, latency may be measured in average time (e.g., in milliseconds) to process a message or may be measured in average time (e.g., in milliseconds) to process a quantity of data (e.g., megabytes). In an example, the performance metrics tracker 120 of the message broker 110 may determine a throughput (e.g., 10 msg/s) and latency (e.g., 25 ms) of the consumer 150 after transmitting the first set of messages (e.g., 20 messages) to the consumer 150.

The example method 200 may also include transmitting a second set of messages to the consumer based on at least one of a change in the quantity of consumers and the one or more performance metrics meeting a respective predetermined threshold (block 212). For example, the second set of messages includes a second measurable quantity (e.g., 10 messages). In some instances, a consumer 150 may process all of the messages in the first set of messages (e.g., 20 messages) prior to the message broker 110 transmitting the second set of messages. In other instances, a consumer 150 may only process a portion (e.g., 10 messages) of the messages in the first set of messages (e.g., 20 messages) when the message broker 110 transmits the second set of messages.

A message broker 150 may transmit a second set of messages to a consumer 150 to refill the message cache of the consumer 150. If the message broker 110 measures no change in the quantity of consumers and none of the performance metrics meet a threshold, then the message broker 110 will refill the message cache of the consumer 150 according to the initial cache size (e.g., 20 messages) that the message broker 110 attributed to the consumer 150 upon transmitting the first set of messages (e.g., 20 messages) to the consumer 150. For example, if the consumer 150 has acknowledged ten messages of the twenty messages in the first set, then the message broker 110 may transmit a second set of messages that includes ten messages to refill the cache of the consumer 150 back to twenty messages.

However, the change in the quantity of consumers, or the one or more performance metrics of a consumer 150 meeting a respective predetermined threshold, may cause the message broker 150 to adjust the cache size that it attributes to the consumer 150. For instance, the message broker 110 may determine that the throughput of the consumer 150 increased to meet a threshold, and accordingly may increase (e.g., to 25 messages) the cache size it attributes to the consumer 150 from the initial cache size (e.g., 20 messages). Thus, when the message broker 110 transmits a second set of messages to the consumer 150 to refill the cache of the consumer 150, the second set of messages will include 15 messages to refill the cache to 25 messages instead of the initial cache size of 20 messages. Various examples of how the cache size attributed to a consumer, and thus the second set of messages, may be adjusted are described in more detail below.

The change in the quantity of consumers may be determined from comparing the determined quantity of the plurality of consumers to the previously determined quantity. In an example, the performance metrics tracker 120 of the message broker 110 comparing the determined quantity (e.g., three) to the previously determined quantity (e.g., two) results in a change (e.g., an increase) in the quantity of consumers. The increase in the quantity of consumers may result in the message broker 110 decreasing the message cache it attributes to the consumer 150. If the consumer 150 acknowledged each of the messages in the first set of messages, the message distributor 118 of the message broker 110 may distribute a second set of messages (e.g., 18 messages) equal to an adjusted cache size that is less than the first set of messages (e.g., 20 messages) to the consumer 150. If the consumer 150 acknowledged only a portion (e.g., 10 messages) of the first set, the message distributor 118 may distribute a second set (e.g., 8 messages) to max out the adjusted cache size (e.g., 18 messages).

In another example, the previously determined quantity may be six consumers, thus resulting in a decrease (e.g., 6 to 3) in the quantity of consumers. The decrease in the quantity of consumers may result in the message broker 110 increasing the message cache it attributes to the consumer 150. If the consumer 150 acknowledged each of the messages in the first set of messages, the message distributor 118 of the message broker 110 may distribute a second set of messages (e.g., 30 messages) equal to an adjusted cache size that is greater than the first set of messages (e.g., 20 messages). If the consumer 150 acknowledged only a portion (e.g., 10 messages) of the first set, the message distributor 118 may distribute a second set (e.g., 20 messages) to max out the adjusted cache size (e.g., 30 messages).

In some examples, the increase or decrease in the adjusted cache size, and thus the measurable quantity of the second set, may be proportional to the decrease or increase of the change in the quantity of consumers. For example, in instances in which a consumer has acknowledged each message in the first set, if the quantity of consumers increases from 20 to 23, the measurable quantity may decrease from 10 messages to 9 messages, whereas if the quantity of consumers increases from 20 to 40, the measurable quantity may decrease from 10 messages to 5 messages. The same may be true for a decrease in the quantity of consumers. Various proportions may be used between the change in the quantity of consumers and the measurable quantity. Accordingly, as has been described, by spreading the messages out among the consumers when there are more consumers, it is less likely that an individual consumer will run out of memory and it is less likely that messages will remain in a consumer's cache while another consumer does not have any messages. However, when the quantity of consumers decreases, each consumer must process more messages if it is able to, even if messages spend a longer amount of time in each respective consumer's cache. Accordingly, the message broker 110 may increase overall message processing efficiency (e.g., overall throughput and latency per consumer in communication with the message broker 110) by spreading messages among consumers to maximize the concurrent processing of messages.

In various aspects, each performance metric includes its own respective predetermined threshold. For example, the predetermined threshold for throughput may be 8 msg/s and the predetermined threshold for latency may be 30 ms. In various aspects of the present disclosure, the predetermined thresholds for the performance metrics may be programmed into the memory 116 of the message broker 110 upon manufacture. In some aspects, the predetermined thresholds are programmed into the memory 116 by a user of the message broker 110 at a time subsequent to manufacture. In some examples, the predetermined thresholds may be adjusted by the user of the message broker 110 at any time.

In various instances, a determined throughput increasing to meet its respective predetermined threshold may result in the message broker 110 increasing the message cache it attributes to the consumer 150. In an example, the performance metrics tracker 120 of the message broker 110, prior to transmitting the first set of messages, determined a throughput of 6 msg/s (e.g., less than the throughput threshold of 8 msg/s) of the consumer 150. After transmitting the first set of messages, the performance metrics tracker 120 determines a throughput of 7 msg/s of the consumer 150. Thus, the throughput of the consumer 150 increased, but it does not meet the threshold of 8 msg/s so the message distributor 118 maintains the attributed cache size of the consumer 150. In another example, after transmitting the first set of messages, the performance metrics tracker 120 determines a throughput of 10 msg/s of the consumer 150. Therefore, the throughput of the consumer 150 increased to meet the predetermined threshold of 8 msg/s. In some instances, a throughput (e.g., 8 msg/s) that equals the predetermined threshold (e.g., 8 msg/s) may constitute meeting the threshold, while in other instances it may constitute failing to meet the threshold.

In instances in which the consumer 150 acknowledged each of the messages in the first set of messages and meets the throughput threshold, the message distributor 118 may transmit a second set of messages (e.g., 25 messages) equal to an adjusted cache size greater than the first set of messages (e.g., 20 messages). If the consumer 150 acknowledged only a portion (e.g., 10 messages) of the first set, the message distributor 118 may distribute a second set (e.g., 15 messages) to max out the adjusted cache size (e.g., 25 messages). For instance, the consumer 150 has increased its processing speed by processing messages as fast as or faster than a threshold determined by the increased throughput, and thus the message broker 110 may transmit more messages to the consumer 150 that is performing well to increase overall message processing efficiency.

In various instances, a determined throughput decreasing to fail to meet its respective predetermined threshold may result in the message broker 110 decreasing the message cache it attributes to the consumer 150. In an example, the performance metrics tracker 120 of the message broker 110, prior to transmitting the first set of messages, determined a throughput of 9 msg/s (e.g., greater than the throughput threshold of 8 msg/s) of the consumer 150. After transmitting the first set of messages, the performance metrics tracker 120 determines a throughput of 7 msg/s of the consumer 150. Thus, the throughput of the consumer 150 decreased to fail to meet the predetermined threshold of 8 msg/s.

In instances in which the consumer 150 acknowledged each of the messages in the first set of messages and fails to meet the throughput threshold, the message distributor 118 may transmit a second set of messages (e.g., 18 messages) equal to an adjusted cache size less than the first set of messages (e.g., 20 messages). If the consumer 150 acknowledged only a portion (e.g., 10 messages) of the first set, the message distributor 118 may distribute a second set (e.g., 8 messages) to max out the adjusted cache size (e.g., 18 messages). For instance, the consumer 150 has decreased its processing speed by processing messages slower than a threshold determined by the decreased throughput, and thus the message broker 110 may transmit less messages to the consumer 150 that has decreased performance to increase overall message processing efficiency. The decreased performance may also be an indication that the consumer 150 is running out of resources (e.g., memory) and thus decreasing the set of messages may help prevent the consumer 150 from stalling.

In various instances, a determined latency decreasing to meet its respective predetermined threshold may result in the message broker 110 increasing the message cache it attributes to the consumer 150. In an example, the performance metrics tracker 120 of the message broker 110, prior to transmitting the first set of messages, determined a latency of 33 ms (e.g., greater than the latency threshold of 30 ms) of the consumer 150. After transmitting the first set of messages, the performance metrics tracker 120 determines a latency of 25 ms of the consumer 150. Thus, the latency of the consumer 150 decreased to meet the predetermined threshold of 30 ms. In some instances, a latency (e.g., 30 ms) that equals the predetermined threshold (e.g., 30 ms) may constitute meeting the threshold, while in other instances it may constitute failing to meet the threshold.

In instances in which the consumer 150 acknowledged each of the messages in the first set of messages and meets the latency threshold, the message distributor 118 may transmit a second set of messages (e.g., 25 messages) equal to an adjusted cache size greater than the first set of messages (e.g., 20 messages). If the consumer 150 acknowledged only a portion (e.g., 10 messages) of the first set, the message distributor 118 may distribute a second set (e.g., 15 messages) to max out the adjusted cache size (e.g., 25 messages). For instance, the consumer 150 has decreased its time to acknowledge a message by acknowledging as fast as or faster than a threshold determined by the decreased latency, and thus the message broker 110 may transmit more messages to the consumer 150 that is performing well to increase overall message processing efficiency.

In various instances, a determined latency increasing to fail to meet its respective predetermined threshold may result in the message broker 110 decreasing the message cache it attributes to the consumer 150. In an example, the performance metrics tracker 120 of the message broker 110, prior to transmitting the first set of messages, determined a latency of 25 ms (e.g., less than the latency threshold of 30 ms) of the consumer 150. After transmitting the first set of messages, the performance metrics tracker 120 determines a latency of 28 ms of the consumer 150. Therefore, the latency of the consumer 150 increased, but it still meets the predetermined threshold of 30 ms, and thus the message distributor 118 maintains the attributed cache size for the consumer

150. In another example, after transmitting the first set of messages, the performance metrics tracker 120 determines a latency of 31 ms of the consumer 150. Thus, the latency of the consumer 150 increased to fail to meet the predetermined threshold of 30 ms.

In instances in which the consumer 150 acknowledged each of the messages in the first set of messages and fails to meet the latency threshold, the message distributor 118 may transmit a second set of messages (e.g., 19 messages) equal to an adjusted cache size less than the first set of messages (e.g., 20 messages). If the consumer 150 acknowledged only a portion (e.g., 10 messages) of the first set, the message distributor 118 may distribute a second set (e.g., 9 messages) to max out the adjusted cache size (e.g., 19 messages). For instance, the consumer 150 has increased its time to acknowledge a message by acknowledging slower than a threshold determined by the increased latency, and thus the message broker 110 may transmit less messages to the consumer 150 that has decreased performance to increase overall message processing efficiency. The decreased performance may also be an indication that the consumer 150 is running out of resources (e.g., memory) and thus decreasing the set of messages may help prevent the consumer 150 from stalling.

In some aspects of the present disclosure, each respective performance metric may include a plurality of predetermined thresholds. For instance, once a performance metric increases to a threshold, it may keep increasing to an even higher threshold, and vice versa. In an example, the performance metrics tracker 120 of the message broker 110, prior to transmitting the first set of messages, determined a throughput of 7 msg/s (e.g., less than the throughput threshold of 8 msg/s) of the consumer 150. After transmitting the first set of messages, the performance metrics tracker 120 determines a throughput of 10 msg/s of the consumer 150. Thus, the throughput of the consumer 150 increased to meet the predetermined threshold of 8 msg/s. In instances in which the consumer 150 acknowledged each of the messages in the first set of messages, the message distributor 118 may transmit a second set of messages (e.g., 25 messages) equal to an adjusted cache size greater than the first set of messages (e.g., 20 messages). After transmitting the second set of messages, the performance metrics tracker 120 determines a throughput of 15 msg/s, which meets another predetermined threshold of 15 msg/s. Thus, in instances in which the consumer 150 acknowledged each of the messages in the second set of messages, the message distributor 118 may transmit a third set of messages (e.g., 30 messages) equal to an adjusted cache size greater than the second set of messages (e.g., 25 messages).

In another example, the performance metrics tracker 120 of the message broker 110, prior to transmitting the first set of messages, determined a throughput of 9 msg/s (e.g., greater than the throughput threshold of 8 msg/s) of the consumer 150. After transmitting the first set of messages, the performance metrics tracker 120 determines a throughput of 7 msg/s of the consumer 150. Thus, the throughput of the consumer 150 decreased to fail to meet the predetermined threshold of 8 msg/s. In instances in which the consumer 150 acknowledged each of the messages in the first set of messages, the message distributor 118 may transmit a second set of messages (e.g., 18 messages) equal to an adjusted cache size less than the first set of messages (e.g., 20 messages). After transmitting the second set of messages, the performance metrics tracker 120 determines a throughput of 5 msg/s, which fails to meet another predetermined threshold of 6 msg/s. Thus, in instances in which the consumer 150 acknowledged each of the messages in the second set of messages, the message distributor 118 may transmit a third set of messages (e.g., 16 messages) equal to an adjusted cache size less than the second set of messages (e.g., 18 messages).

Accordingly, by adjusting attributed cache sizes for each consumer in response to the changes in each respective consumer's performance metrics (e.g., throughput and latency), the message broker 110 may maximize the system's overall message processing efficiency. For instance, the message broker 110 may balance the throughput and latency of each respective consumer to determine the best message distribution among the consumers. By doing so, the message broker 110 may minimize the occurrence of messages idling in a consumer's cache to reduce overall latency and may maximize the concurrent processing of messages to increase overall throughput.

Figure 3:
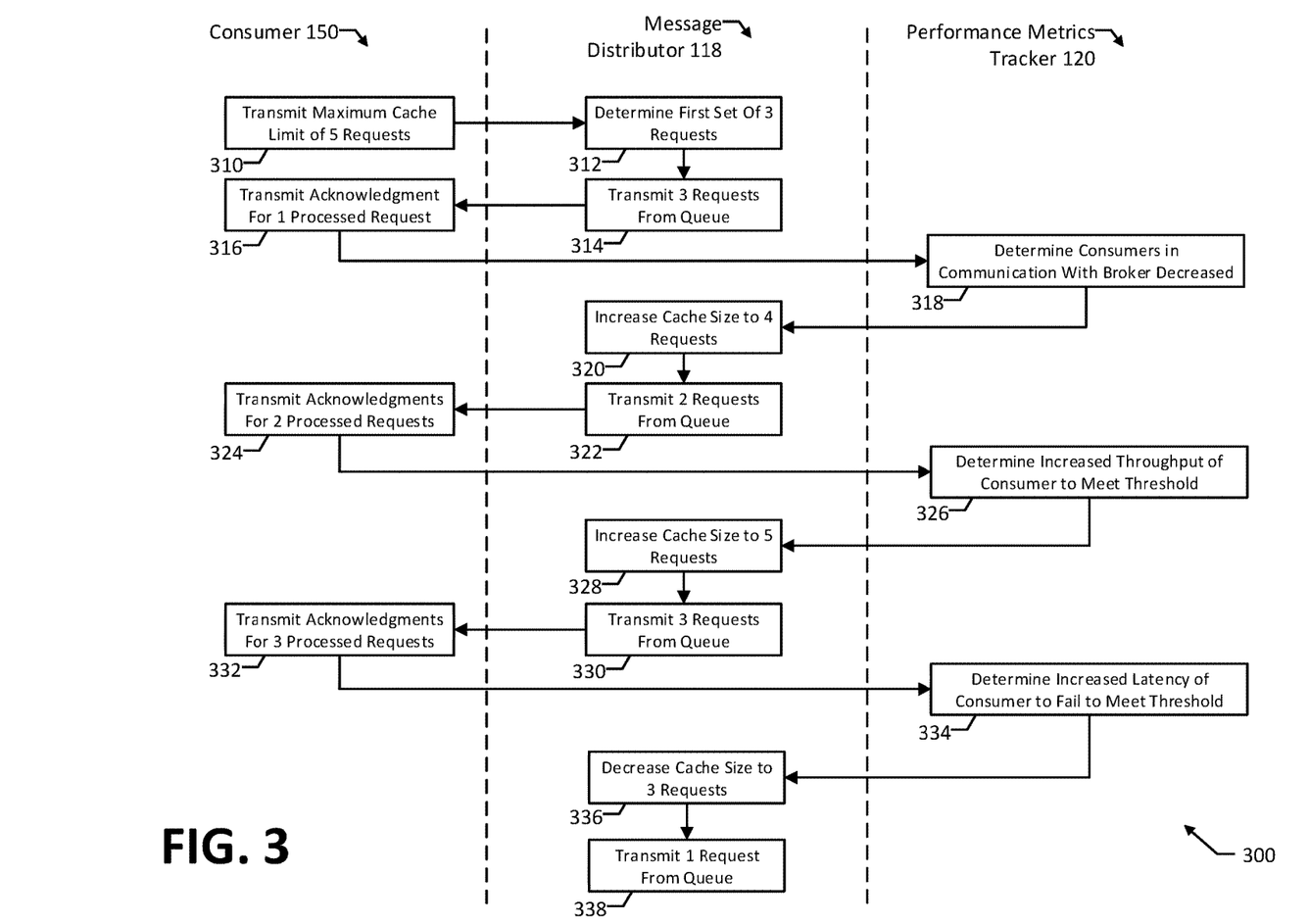
FIG. 3 shows a flow diagram of an example method for distributing messages to a consumer of a set of consumers, according to an aspect of the present disclosure.

FIG. 3 shows a flow diagram of an example method 300 for transmitting messages from a message broker to a consumer in a set of consumers, according to an aspect of the present disclosure. For instance, a website application for compressing video files may act as a producer and transmits video compression requests to a message broker upon a user entering the required information into the website application. The message broker may distribute the video compression requests to a set of consumers, video compression applications, each of which process the requests accordingly to generate the compressed video files corresponding to the compression requests. The video compression applications may be located on separate servers that are also separate from the website application and the message broker.

Although the example method 300 is described with reference to the flowchart illustrated in FIG. 3, it will be appreciated that many other methods of performing the acts associated with the method 300 may be used. For example, the order of some of the blocks may be changed, certain blocks may be combined with other blocks, and some of the blocks described are optional. The method 300 may be performed by processing logic that may comprise hardware (circuitry, dedicated logic, etc.), software, or a combination of both.

The example method 300 includes the consumer 150 (e.g., a video compression application) transmitting a maximum cache limit to a message distributor 118 of a message broker (block 310). The maximum cache limit includes a maximum measureable quantity (e.g., 5 requests) that the message cache of the consumer 150 will accept from the message distributor 118. The message distributor 118 then determines the first set of messages (e.g., the first set of video compression requests) to send to the consumer 150 (block 312). The first set of messages includes a measurable quantity (e.g., 3 requests) that is less than or equal to the received maximum measurable quantity (e.g., 5 requests) of the cache of the consumer 150. The first set of messages is additionally the initial cache size that the message distributor 118 attributes to the consumer 150. The message distributor 118 then transmits three compression requests from the message broker's queue to the consumer 150 (block 314).

The consumer 150 processes one request in the first set and transmits one acknowledgement to the performance metrics tracker 120 of the message broker (block 316). The performance metrics tracker 120 then determines that the quantity of video processing applications in communication with the message broker has decreased (block 318). In response, the message distributor 118 increases the cache size attributed to the consumer 150 to four requests (block 320). Because the consumer 150 has only transmitted one acknowledgment, the consumer 150 still has two requests in its cache. Accordingly, the message distributor 118 transmits two requests from the message broker's queue to the consumer 150 to refill the cache of the consumer 150 to four requests (block 322). The consumer 150 then transmits acknowledgments for two processed compression requests to the performance metrics tracker 120 (block 324).

The performance metrics tracker 120 then determines that the throughput of the consumer 150 increased to meet a threshold (block 326). In response, the message distributor 118 increases the cache size attributed to the consumer 150 to five requests (block 328). Because the consumer 150 has transmitted two acknowledgments, the consumer 150 still has two requests in its cache. Accordingly, the message distributor 118 transmits three requests from the message broker's queue to the consumer 150 to refill the cache of the consumer 150 to five requests (block 330). The consumer 150 then transmits three acknowledgments for processed compression requests to the performance metrics tracker 120 (block 332).

The performance metrics tracker 120 then determines that the latency of the consumer 150 has increased to fail to meet a threshold (block 334). In response, the message distributor 118 decreases the cache size attributed to the consumer 150 to three requests (block 336). Because the consumer 150 transmitted three acknowledgments, the consumer 150 has two requests in its cache. Accordingly, the message distributor 118 transmits one request from the message broker's queue to refill the cache to the consumer 150 to three requests (block 338). In various instances, there are additional consumers (e.g., the consumer 152 and the consumer 154) that are concurrently performing a similar process with the message broker 110 to process video compression requests. Accordingly, the message broker 110 may increase overall video compression processing efficiency, and additionally increase the overall throughput and decrease the overall latency of the website application for compressing video files.

Figure 4:
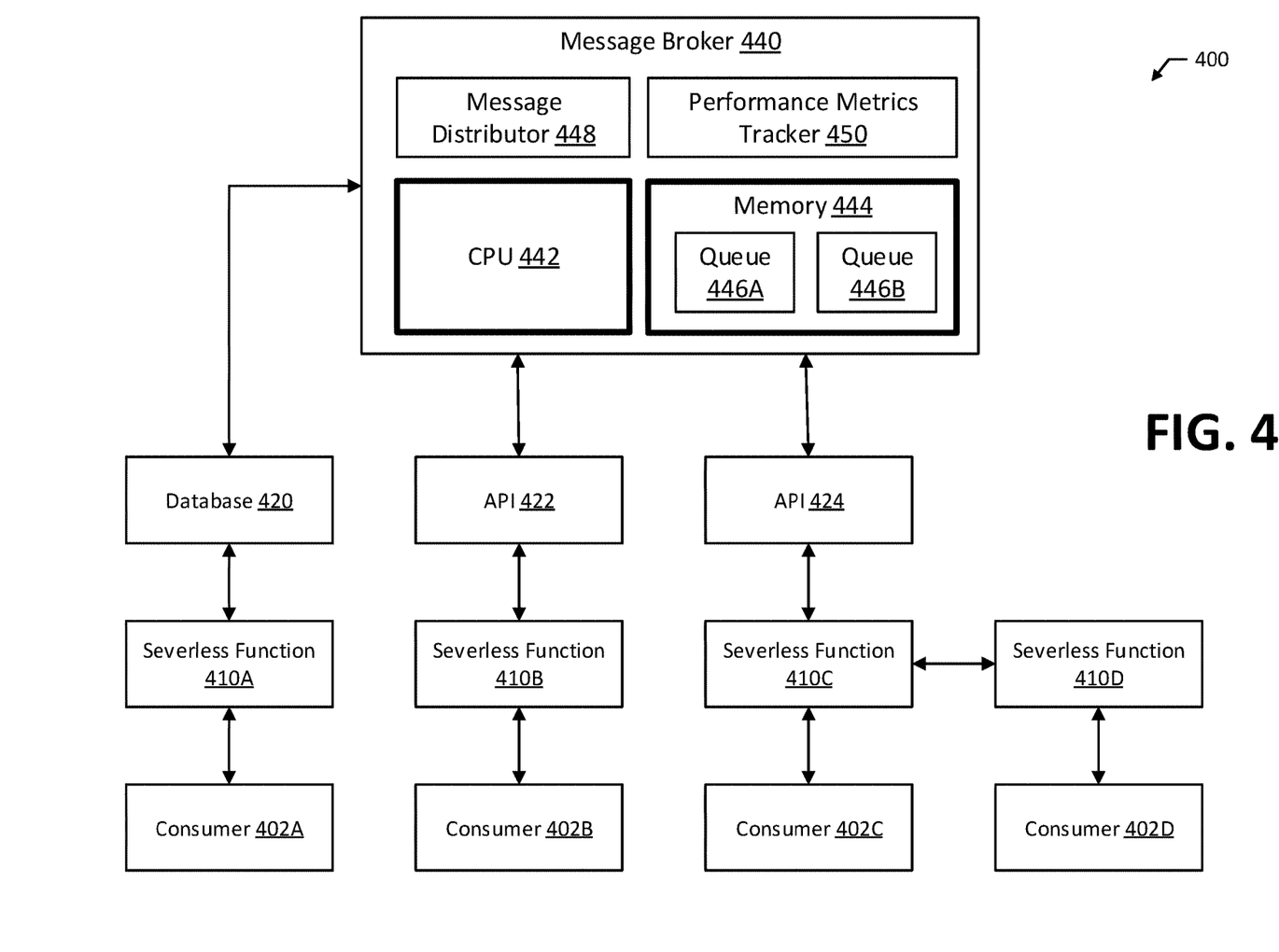
FIG. 4 shows an example message processing system in which consumers are implemented by serverless functions, according to an aspect of the present disclosure.

FIG. 4 shows a block diagram of an example system in which consumers are implemented by serverless functions, according to an aspect of the present disclosure. The example system 400 includes a message broker 440 that distributes messages to a set of consumers 402A, 402B, 402C, 402D that are implemented by serverless functions 410A, 410B, 410C, and 410D, respectively. Each respective serverless function 410A, 410B, 410C, 410D acts as a stateless compute container for each respective consumer 402A, 402B, 402C, 402D that it implements. For instance, a serverless function may be application code written in the form of functions to accomplish various forms of processing. In some examples, a serverless function 410A, 410B, 410C, 410D may be an image processing application, a function to retrieve information from a database, a data analysis application, among other types of message processing applications.

The message broker 440 may be configured in accordance with the example message broker 110 and example methods 200 and 300 described above. For instance, the message broker 440 may include a processor (e.g., a CPU 442) in communication with a memory 444 that includes queues 446A and 446B. For example, the message broker 440 may store social media update requests for a serverless function to initiate in the queue 446A and streaming social media data for a serverless function to perform analysis on in the queue 446B. The message broker 440 may also include a message distributor 448 and a performance metrics tracker 450.

In such instances in which a set of consumers 402A, 402B, 402C, 402D are implemented by serverless functions 410A, 410B, 410C, 410D, the message broker 440 dynamically invokes, or initiates, serverless functions 410A, 410B, 410C, 410D as they are needed to process one or more messages. For instance, the functions in the application code of a serverless function need to be invoked by an event in order to operate. The event could come from some type of API gateway (e.g., http request) if invoking the code from a client application, an event from another serverless function, or an event from another cloud service (e.g., after something is uploaded). For example, the serverless function 410A may be invoked when an item is created in a database 420, the serverless function 410B may be invoked by the API gateway 422, and the serverless functions 410C and 410D may be invoked by the API gateway 424. Accordingly, in an example, the message broker 440 may determine a quantity of consumers 402A, 402B, 402C, 402D that are implemented by a respective serverless functions 410A, 410B, 410C, 410D and may measure performance metrics of each implemented consumer 402A, 402B, 402C, 402D against respective thresholds to determine how to distribute messages to the consumers 402A, 402B, 402C, 402D when a respective serverless function 410A, 410B, 410C, 410D is invoked.

Figure 5:
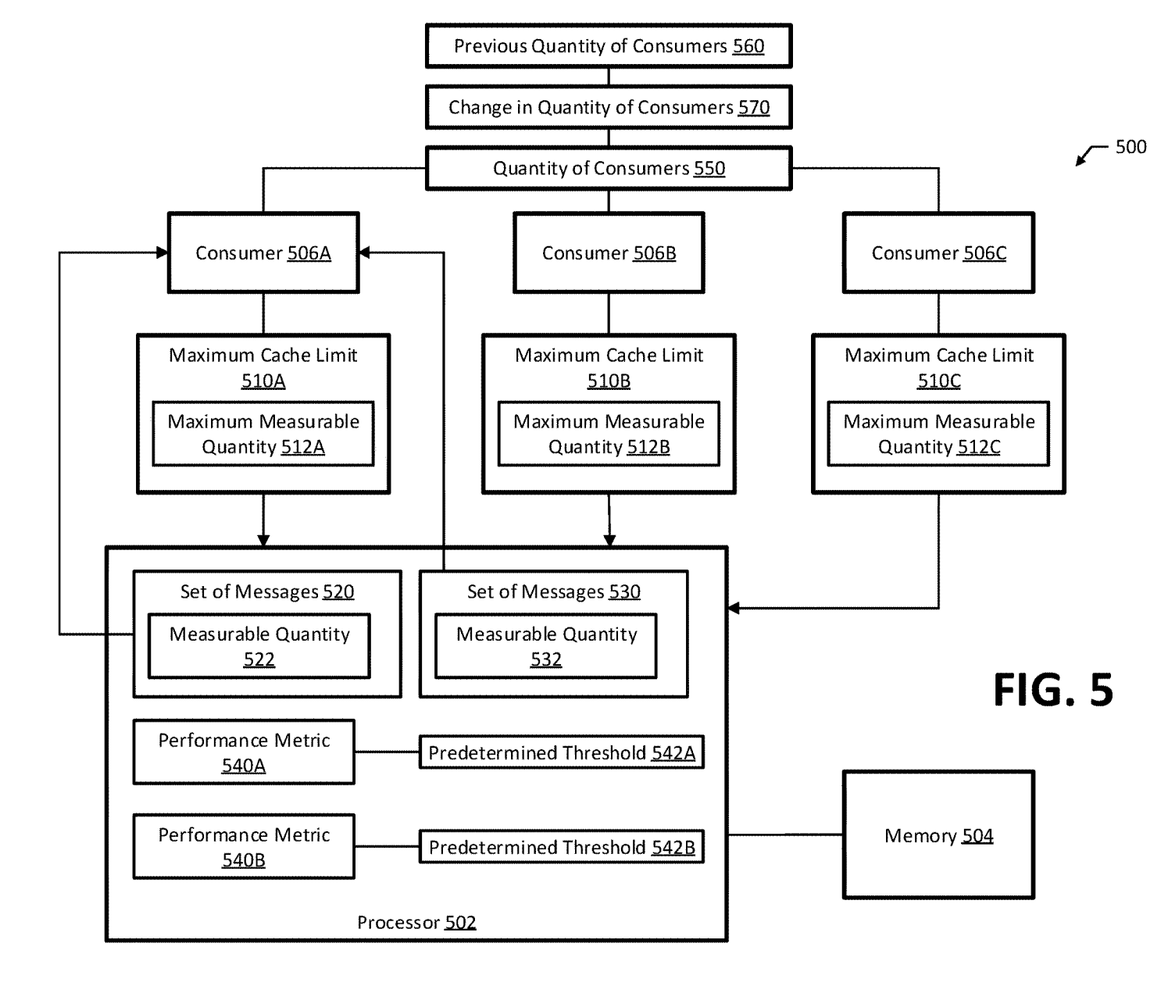
FIG. 5 shows an example system for distributing messages to consumers, according to an aspect of the present disclosure.

FIG. 5 shows a block diagram of an example system for adaptively adjusting the message cache size of a consumer. The example system 500 includes a processor 502 in communication with a memory 504. The processor 502 is configured to receive a maximum cache limit 510A, 510B, 510C from each of a plurality of consumers 506A, 506B, 506C in communication with the processor 502. Each maximum cache limit 510A, 510B, 510C includes a maximum measurable quantity 512A, 512B, 512C. The processor 502 is also configured to transmit a set of messages 520 to a consumer 506A of the plurality of consumers 506A, 506B, 506C. The set of messages 520 includes a measurable quantity 522 less than the respective maximum measurable quantity 512A of the maximum cache limit 510A of the consumer 506A.

The processor 502 is also configured to determine a quantity 550 of the plurality of consumers 506A, 506B, 506C and to compare the determined quantity 550 to a previously determined quantity 560 of consumers 506A, 506B, 506C. The processor 502 is also configured to determine one or more performance metrics 540A, 540B related to the consumer 506A after transmitting the set of messages 520. The processor 502 transmits a set of messages 530 to the consumer 506A. The set of messages 530 includes a measurable quantity 532 based on at least one of a change 570 in the quantity of consumers 550 and the one or more performance metrics 540A, 540B meeting a respective predetermined threshold 542A, 542B.

It will be appreciated that all of the disclosed methods and procedures described herein can be implemented using one or more computer programs or components. These components may be provided as a series of computer instructions on any conventional computer readable medium or machine-readable medium, including volatile or non-volatile memory, such as RAM, ROM, flash memory, magnetic or optical disks, optical memory, or other storage media. The instructions may be provided as software or firmware, and/or may be implemented in whole or in part in hardware components such as GPUs, ASICs, or any other similar devices. The instructions may be configured to be executed by one or more processors, which when executing the series of computer instructions, performs or facilitates the performance of all or part of the disclosed methods and procedures.

Without further elaboration, it is believed that one skilled in the art can use the preceding description to utilize the claimed inventions to their fullest extent. The examples and embodiments disclosed herein are to be construed as merely illustrative and not a limitation of the scope of the present disclosure in any way. It will be apparent to those having skill in the art that changes may be made to the details of the above-described embodiments without departing from the underlying principles discussed. In other words, various modifications and improvements of the embodiments specifically disclosed in the description above are within the scope of the appended claims. For example, any suitable combination of features of the various embodiments described is contemplated.

The invention is claimed as follows:

1. A message broker system for distributing messages to consumers comprising:
   a performance metrics tracker;
   a message distributor;
   a memory; and
   a processor, in communication with the memory, to:
   receive a maximum cache limit from each consumer of a set of consumers in communication with the message broker system, wherein each maximum cache limit includes a maximum measurable quantity;
   transmit, via the message distributor, a first set of messages to a first consumer of the set of consumers in communication with the message broker system, wherein the first set of messages includes a first measurable quantity less than or equal to the respective maximum measurable quantity of the maximum cache limit of the first consumer;
   determine, via the performance metrics tracker, a count of all of the consumers in the set of consumers that are in communication with the message broker system;
   compare, via the performance metrics tracker, the determined count of consumers to a previously determined count;
   determine, via the performance metrics tracker, one or more performance metrics related to the first consumer after transmitting the first set of messages; and
   transmit, via the message distributor, a second set of messages to the first consumer, wherein the second set of messages includes a second measurable quantity based on a change in the count of consumers and the one or more performance metrics meeting a respective predetermined threshold.

2. The message broker system of claim 1, wherein the respective measured quantities include a quantity of messages.

3. The message broker system of claim 1, wherein the respective measured quantities include a quantity of bytes.

4. The message broker system of claim 1, wherein the maximum cache limit for each respective consumer of the set of consumers in communication with the message broker system is based on a percentage of memory available to the respective consumer.

5. The message broker system of claim 1, wherein the second set of messages includes a second measurable quantity greater than the first measurable quantity responsive to the change in the count of consumers including a decrease in the count of consumers, and wherein the second set of messages includes a second measurable quantity less than the first measurable quantity responsive to the change in the count of consumers including an increase in the count of consumers.

6. The message broker system of claim 1, wherein the one or more performance metrics include a throughput or a latency of the first consumer.

7. The message broker system of claim 6, wherein the respective predetermined threshold for the throughput is a rate at which the first consumer processes messages, and wherein the second set of messages includes a second measurable quantity greater than the first measurable quantity responsive to the determined throughput increasing to meet the respective predetermined threshold.

8. The message broker system of claim 6, wherein the respective predetermined threshold for the throughput is a rate at which the first consumer processes messages, and wherein the second set of messages includes a second measurable quantity less than the first measurable quantity responsive to the determined throughput decreasing to fail to meet the respective predetermined threshold.

9. The message broker system of claim 6, wherein the predetermined threshold for the latency is an amount of time for the consumer to process a message, and wherein the second set of messages includes a second measurable quantity greater than the first measurable quantity responsive to the determined latency decreasing to meet the respective predetermined threshold.

10. The message broker system of claim 6, wherein the predetermined threshold for the latency is an amount of time for the consumer to process a message, and wherein the second set of messages includes a second measurable quantity less than the first measurable quantity responsive to the determined latency increasing to fail to meet the respective predetermined threshold.

11. The message broker system of claim 1, wherein the message broker system further includes a plurality of queues, wherein the processor is further configured to receive a plurality of maximum cache limits from a respective consumer of the set of consumers in communication with the message broker system, and wherein each respective maximum cache limit of the plurality of maximum cache limits corresponds to a respective queue of the plurality of queues.

12. The message broker system of claim 1, wherein each respective consumer of the set of consumers in communication with the message broker system is implemented by one or more serverless functions.

13. A method for a message broker to distribute messages to consumers comprising:
   receiving a maximum cache limit from each consumer of a set of consumers in communication with the message broker, wherein each maximum cache limit includes a maximum measurable quantity;
   transmitting, via a message distributor of the message broker, a first set of messages to a first consumer of the set of consumers in communication with the message broker, wherein the first set of messages includes a first measurable quantity less than or equal to the respective maximum measurable quantity of the first consumer;
   determining, via a performance metrics tracker of the message broker, a count of all of the consumers in the set of consumers that are in communication with the message broker;
   comparing, via the performance metrics tracker, the determined count of consumers to a previously determined count;

determining, via the performance metrics tracker, one or more performance metrics related to the first consumer after transmitting the first set of messages; and transmitting, via the message distributor, a second set of messages to the first consumer, wherein the second set of messages includes a second measurable quantity based on a change in the count of consumers and the one or more performance metrics meeting a respective predetermined threshold.

14. The method of claim 13, wherein the first measurable quantity of the first set of messages is based on the count of all the consumers in the set of consumers in communication with the message broker.

15. The method of claim 13, wherein the first measurable quantity of the first set of messages is based on a default cache size stored in a memory of the message broker.

16. The method of claim 13, wherein the first measurable quantity of the first set of messages is based on a plurality of previously transmitted sets of messages to a respective consumer and a plurality of previously determined performance metrics of the respective consumer.

17. The method of claim 13, wherein each respective performance metric includes a plurality of respective predetermined thresholds.

18. A non-transitory, computer-readable medium storing instructions for a message broker to distribute messages to consumers, which when executed by a processor of the message broker, cause the processor to:

receive a maximum cache limit from each consumer of a set of consumers in communication with the message broker, wherein each maximum cache limit includes a maximum measurable quantity;

transmit, via a message distributor of the message broker, a first set of messages to a first consumer of the set of consumers in communication with the message broker, wherein the first set of messages includes a first measurable quantity less than or equal to the respective maximum measurable quantity of the first consumer;

determine, via a performance metrics tracker of the message broker, a count of all the consumers in the set of consumers that are in communication with the message broker;

compare, via the performance metrics tracker, the determined count of consumers to a previously determined count;

determine, via the performance metrics tracker, one or more performance metrics related to the first consumer after transmitting the first set of messages; and transmit, via the message distributor, a second set of messages to the first consumer, wherein the second set of messages includes a second measurable quantity based on a change in the count of consumers and the one or more performance metrics meeting a respective predetermined threshold.

19. The non-transitory, computer-readable medium storing instructions of claim 18, wherein the maximum cache limit of the first consumer is different than the maximum cache limit of at least one other consumer of the set of consumers in communication with the message broker.

20. The non-transitory, computer-readable medium storing instructions of claim 18, wherein the instructions further cause the processor to generate a default cache size for a respective consumer of the set of consumers in communication with the message broker based on a plurality of transmitted sets of messages to the respective consumer and a plurality of determined performance metrics of the respective consumer.

* * * * *